(12) United States Patent
Hasegawa et al.

(10) Patent No.: US 6,224,769 B1
(45) Date of Patent: May 1, 2001

(54) METHOD AND APPARATUS FOR TREATING ORGANIC WASTE WATER

(75) Inventors: Susumu Hasegawa; Akira Akashi; Kenji Katsura; Masahiko Miura, all of Kobe; Takahiro Fukui, Kawanishi, all of (JP)

(73) Assignee: Shinko Pantec Co., Ltd., Hyogo (JP)

( * ) Notice: Subject to any disclaimer, the term of this patent is extended or adjusted under 35 U.S.C. 154(b) by 0 days.

(21) Appl. No.: 09/173,224

(22) Filed: Oct. 15, 1998

(30) Foreign Application Priority Data

Jun. 5, 1997 (JP) .................................... 9-148143
Dec. 19, 1997 (JP) .................................... 9-351217
Aug. 21, 1998 (JP) ................................. 10-235238

(51) Int. Cl.[7] ........................................ C02F 3/00
(52) U.S. Cl. ............................................... 210/606
(58) Field of Search ................................... 210/606, 609, 210/613, 623, 624, 625, 626, 627, 628, 768, 790

(56) References Cited

U.S. PATENT DOCUMENTS

| | | | |
|---|---|---|---|
| 4,132,638 | * | 1/1979 | Carlsson .................................... 210/7 |
| 4,204,958 | | 5/1980 | Kaelin .................................... 210/178 |
| 4,915,840 | | 4/1990 | Rozich .................................... 210/605 |

FOREIGN PATENT DOCUMENTS

| | | | |
|---|---|---|---|
| 6-206088 | 7/1994 | (JP) | .................................... C02F/3/12 |
| 9-010791 | 1/1997 | (JP) | .................................... C02F/3/12 |
| 9-099298 | 4/1997 | (JP) | .................................... C02F/11/02 |
| 9-276887 | 10/1997 | (JP) | .................................... C02F/3/12 |
| WO 93/04988 | 3/1993 | (WO) | .................................... C02F/3/12 |
| WO 97/05072 | 2/1997 | (WO) | .................................... C02F/3/12 |

* cited by examiner

Primary Examiner—Chester T. Barry
(74) Attorney, Agent, or Firm—Marshall, O'Toole, Gerstein, Murray & Borun

(57) ABSTRACT

A method and apparatus are disclosed for treating an organic waste water which are capable of utilizing compact equipment by reducing the quantity of a sludge to be treated. Organic waste water (A) is subjected to an aerobic biological treatment in a biological treatment tank (3). Then, solution (B) obtained by the treatment in the biological treatment tank (3) is solid-liquid separated into treated water (C) and sludge (D) in precipitation tank (5). A portion of the sludge (D) separated in the precipitation tank (5) is returned to the biological treatment tank (3) through a route (6). A portion (E) of the sludge separated in the precipitation tank (5)is concentrated by a concentration device (8). Thereafter, the concentrated sludge (E) is solubilized by thermophilic bacteria in a solubilizing tank (10).

2 Claims, 9 Drawing Sheets

METHOD AND APPARATUS FOR TREATING ORGANIC WASTE WATER

FIELD OF THE INVENTION

The present invention relates to an apparatus for discharging an organic sludge, in particular to a method and an apparatus for treating, by biological digestion, organic wastes containing organic sludge discharged from a sewage treatment process, such as a sewage treatment plant, a night soil treatment plant, and the like, and from a manufacturing process, such as a food factory, a chemical factory, and the like.

BACKGROUND OF THE INVENTION

Conventionally, an aerobic biological treatment method, which is referred to as an activated sludge method, has been used to treat organic waste water. This method is carried out as shown in FIG. 8, wherein organic waste water, such as sewage, introduced from organic waste water reservoir 1 into biological treatment tank 3 is decomposed into an inorganic matter, such as carbon dioxide or water, under aerobic conditions in biological treatment tank 3 by biological oxidation, which is oxidative decomposition performed by a microorganism. The waste water which has been treated in the biological treatment tank 3 is solid-liquid separated into treated water C and sludge D in precipitation tank 5. In general, a portion of sludge D is returned as a microorganism source to biological treatment tank 3, and the residual sludge is treated as an excess sludge E.

In this case, however, precipitated and concentrated sludge containing an organic solid, which has been solid-liquid separated in the precipitation tank 5, is treated through the steps of concentration, digestion, dehydration, composting, and incineration. Such a treatment is not preferred because it requires a large quantity of labor, time, and expense.

For this reason, methods of decreasing a sludge as much as possible, such as an extended aeration method for increasing the residence time of the sludge, and a fixed bed oxidation method utilizing a biomass attached to a catalytic material surface of a media to hold a large quantity of microorganisms in a reaction tank (see "Sewage Service Project—Design Guide and Explanation" issued by Japan Sewage Works Agency, edited by Sewage Works Division, Municipal Department of the Ministry of Construction, Vol. 2, 1994), have been proposed and commercialized. However, these methods require a large site area for increasing the residence time. In the extended aeration method, the sludge is dispersed when a load is reduced, thereby interfering with solid-liquid separation. In the fixed bed oxidation method, fouling of the sludge results when the load is increased. Therefore, these methods are not desirable. In order to solve these problems, a method has been proposed which temporarily stores an excess sludge, and decreases the sludge by an anaerobic digestion method to reduce the quantity of the sludge and to lessen the waste treatment load. In this method, the treatment time is long, for example 20 to 30 days, and the decrease of organic sludge is not sufficient, for example 30% to 50%.

Japanese Provisional Patent Publication No. 6-206088 discloses a method for performing an aerobic biological treatment on organic waste water, and then oxidizing a solid-liquid separated sludge by an ozone oxidation column, to reduce an excess sludge. However, this method requires operators well-skilled in handling the ozone oxidation column, and has the problem of treating residual ozone. In addition, the decomposition rate of the excess sludge is not sufficient in the ozone oxidation column.

Japanese Provisional Patent Publication No. 9-10791 discloses an activated sludge treatment method capable of considerably reducing the quantity of a generated excess sludge. The method comprises steps of subjecting organic waste water to an aerobic biological treatment in an aeration tank, solid-liquid separating the waste water treated in the aeration tank into treated water and a sludge in a precipitation device, returning a part of the sludge separated in the precipitation device to the aeration tank through a recycle route, solubilizing the excess sludge separated in the precipitation device at a high temperature in a solubilizing treatment device, and returning the treated sludge solubilized in the solubilizing treatment device to the aeration tank through a return route. According to the method described in the publication, however, it is necessary to increase the size of the solubilizing treatment device according to the maximum quantity of the excess sludge which flows into solubilizing treatment equipment. Furthermore, a large quantity of treated sludge solubilized in the solubilizing treatment device is returned to the aeration tank. Therefore, the substantial residence time is shortened in the aeration tank. Consequently, the quality of treated water at times is reduced.

Japanese Provisional Patent Publication No. 9-276887, as shown in FIG. 9, discloses an organic waste water treatment apparatus comprising an activated sludge treatment tank 21, a solid-liquid separation device 22 for solid-liquid separating a sludge obtained after an activated sludge treatment, a sludge returning means 23 for returning a part of the separated sludge to activated sludge treatment tank 21, a sludge concentration device 24 for concentrating the residual sludge, a heating device 25 for heating the concentrated sludge to a temperature of 40 to 100° C., and a sludge returning means 26 for returning the heated sludge to activated sludge treatment tank 21. According to the treatment apparatus, the excess sludge separated in solid-liquid separation device 22 is concentrated in sludge concentration device 24, and then is sent to heating device 25. There is therefore the advantage that the quantity of the sludge sent to heating device 25 can be decreased. In the treatment apparatus, however, the sludge is solubilized in only a heating treatment. For this reason, the solubilization ratio of the sludge is low, for example 20% to 25%. It should take a long time to solubilize a large quantity of sludge by using a solubilizing tank of a large capacity. Consequently, the scale of equipment is enlarged. Thus, the treatment apparatus has a disadvantage that the cost of heating, the maintenance cost, and the like are increased.

In order to reduce the equipment cost, furthermore, it is preferable to reduce the number of required devices and the space occupied by the devices.

SUMMARY OF THE INVENTION

In consideration of the above-mentioned problems of the prior art, it is an aspect of the present invention to provide a method and apparatus for treating an organic waste water which are capable of utilizing compact equipment by reducing the quantity of sludge to be treated.

It is another aspect of the present invention to provide a method and apparatus for treating an organic waste water which are capable of improving the quality of treated water.

It is yet another aspect of the present invention to provide a method and apparatus for efficiently treating an organic waste water at a low cost.

It is a further aspect of the present invention to provide a method of treating an organic waste water which is capable of specifying and shortening the treatment time for solubilizing reaction and of efficiently performing sufficient solubilization.

In order to attain the above-mentioned aspects, the present invention employs a method comprising the steps of biologically treating organic waste water by a biological treatment device, solid-liquid separating the waste water treated by the biological treatment device into treated water and a sludge by a solid-liquid separation device, concentrating at least a portion of the sludge separated by the solid-liquid separation device by a concentration device, and directing the concentrated sludge to a solubilizing tank. Consequently, the quantity of the treated sludge directed to the solubilizing tank can be decreased. Thus, the size of the solubilizing tank can be reduced. In particular, the concentrated sludge is directed to the solubilizing tank, such that the nutritive conditions suitable for the growth of thermophilic bacteria can be obtained. Therefore, a high solubilization ratio can be obtained by performing a solubilizing treatment using the thermophilic bacteria in the solubilizing tank.

The solid-liquid separated sludge is concentrated, and then returned to the biological treatment device. Consequently, the quantity of microorganisms returned to the biological treatment device is increased. Therefore, the quantity of microorganisms in the biological treatment device can be kept at a high concentration, such that the organic matter is fully oxidatively decomposed by the microorganisms. As a result, the sludge load is reduced, whereby the quality of treated water can be improved.

Furthermore, the solubilizing treatment for the sludge is carried out using heat, and under the conditions wherein a sludge solubilization enzyme is produced and secreted from the microorganisms, and solubilization is promoted by the enzyme. The time taken for the solubilizing treatment is determined based on a hydraulic residence time (hereinafter referred to as an "HRT") of treated sludge in the solubilizing treatment device. Consequently, it is possible to avoid a lengthy solubilizing reaction. Therefore, even if the size of the solubilizing tank is reduced, the solubilizing treatment can be performed efficiently.

DESCRIPTION OF THE PREFERRED EMBODIMENTS

Figure 1:
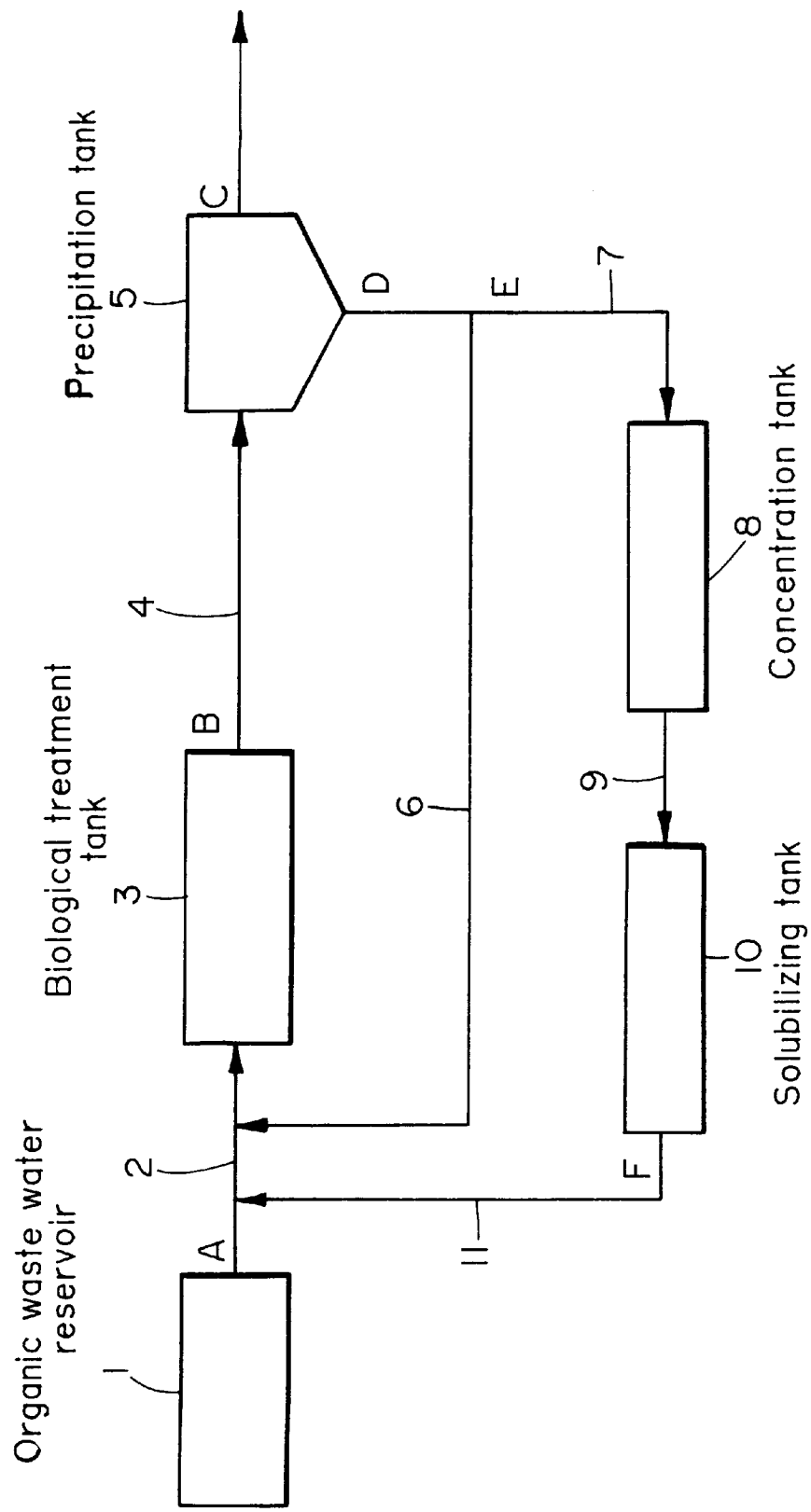
FIG. 1 is a structural diagram schematically showing an apparatus for treating an organic waste water suitable for executing a method of treating an organic waste water according to an embodiment of the present invention.

A first aspect of the present invention is directed to a method of biologically treating an organic waste water which comprises the steps of biologically treating the organic waste water by a biological treatment device, solid-liquid separating the waste water treated by the biological treatment device into treated water and a sludge by a solid-liquid separation device, returning a portion of the sludge separated by the solid-liquid separation device to the biological treatment device, concentrating at least a portion of a residual sludge by a concentration device, and solubilizing the concentrated sludge by thermophilic bacteria in a solubilizing tank. According to this method, at least a portion of the sludge separated by the solid-liquid separation device is concentrated by the concentration device, and then directed to the solubilizing tank. Therefore, it is possible to ensure the nutritive conditions suitable for growth of thermophilic bacteria, and attain a high solubilization ratio by the production of a solubilizing enzyme. Further, since at least a portion of the sludge is concentrated and then sent to the solubilizing tank, the quantity of the treated sludge sent to the solubilizing tank is decreased such that the size of the solubilizing tank can be reduced.

A second aspect of the present invention is directed to a method of treating an organic waste water according to the first aspect of the present invention, wherein at least a portion of the treated liquid solubilized by the solubilizing tank is returned to the biological treatment device. Consequently, the solubilized treated liquid is biologically digested in the biological treatment device simultaneously with the decrease of the sludge.

A third aspect of the present invention is directed to a method of biologically treating an organic waste water which comprises the steps of biologically treating the organic waste water by a biological treatment device, solid-liquid separating the waste water treated by the biological treatment device into treated water and a sludge by a solid-liquid separation device, concentrating the sludge separated by the solid-liquid separation device in a concentration device, returning a portion of the sludge to the biological treatment device, and solubilizing at least a portion of a residual sludge by thermophilic bacteria in a solubilizing tank. According to this method, all the sludge separated by the solid-liquid separation device is concentrated, and a portion of the concentrated sludge is directed to the solubilizing tank. Therefore, the following advantages can be obtained in addition to the advantage that a high solubilization ratio can be ensured and the size of the solubilizing tank can be reduced in the same manner as in the first aspect of the present invention. More specifically, a portion of the sludge separated by the solid-liquid separation device is concentrated and then directed to the biological treatment device. Therefore, the quantity of microorganisms in the biological treatment device is increased more than in the first aspect of the present invention. Consequently, the quantity of microorganisms in the biological treatment device can be kept at a high concentration, and an organic matter is fully decomposed by the microorganisms. As a result, the sludge load is reduced such that the quality of treated water can advantageously be improved.

A fourth aspect of the present invention is directed to a method of treating an organic waste water according to the third aspect of the present invention wherein at least a portion of the treated liquid solubilized by the solubilizing tank is returned to the biological treatment device. Consequently, the above-mentioned advantages can be obtained.

A fifth aspect of the present invention is directed to a method of biologically treating an organic waste water which comprises the steps of biologically treating the organic waste water by a biological treatment device having a membrane separation device provided in a tank, concentrating at least a portion of the sludge in the biological treatment device by a concentration device, and solubilizing the concentrated sludge by thermophilic bacteria in a solubilizing tank. According to this method, the digesting decomposition of the organic waste water and the solid-liquid separation based on membrane separation are performed at the same time. Therefore, the waste water can be treated efficiently. At least a portion of the sludge in the biological treatment device is concentrated by the concentration device and then directed to the solubilizing tank. Therefore, the following advantage can be obtained in addition to the advantage that a high solubilization ratio can be ensured and the size of the solubilizing tank can be reduced in the same manner as in the first and third aspects of the present invention. More specifically, there is no hindrance to solid-liquid separation caused by a deterioration of the sedimentation properties of the sludge in a gravity sedimentation tank. Therefore, the quantity of biomass in the biological treatment device can be easily set to a high concentration such that the quality of treated water can be enhanced.

A sixth aspect of the present invention is directed to a method of treating an organic waste water according to the fifth aspect of the present invention wherein at least a portion of the treated liquid solubilized by the solubilizing tank is returned to the biological treatment device. Consequently, the above-mentioned advantages can be obtained.

A seventh aspect of the present invention is directed to a method of treating an organic waste water according to any of the first through sixth aspects of the present invention wherein the sludge is concentrated to have a water content of 99% or less (a sludge concentration of 1% or more) by the concentration device. Consequently, nutritive conditions more suitable for the growth of thermophilic bacteria can be obtained. Therefore, the solubilizing treatment can be performed more efficiently, and the size of the solubilizing tank can be further reduced. Even if the sludge is concentrated to have a water content of 90% or less, the above-mentioned advantages cannot be achieved. Conversely, the flow properties are deteriorated, and in the case where the solubilizing tank is operated aerobically or microaerobically, aeration causes a foaming phenomenon. Therefore, it is preferable that the sludge is concentrated by the concentration device with a water content of 90% to 99%.

An eighth aspect of the present invention is directed to a method of treating an organic waste water according to any of the first through sixth aspects of the present invention wherein the solubilizing treatment is carried out using heat and under conditions such that a sludge solubilization enzyme is produced and secreted from a microorganism and solubilization is promoted by the enzyme, and the time required for the solubilizing treatment is determined based on the HRT (hydraulic residence time) of the treated sludge in the solubilizing treatment device. Consequently, solubilization is performed under conditions such that the solubilization enzyme can be produced and can perform solubilization. Thus, a lengthy solubilizing reaction can be avoided. Therefore, the size of the solubilizing tank can be reduced and the solubilizing treatment can be performed advantageously.

A ninth aspect of the present invention is directed to a method of treating an organic waste water according to the eighth aspect of the present invention, wherein the HRT is 3 to 24 hours. Consequently, the sludge can be solubilized efficiently.

A tenth aspect of the present invention is directed to an apparatus for biologically treating an organic waste water. The apparatus comprises a biological treatment device for biologically treating the organic waste water, a solid-liquid separation device for solid-liquid separating the waste water treated by the biological treatment device into treated water and a sludge, a route for returning a portion of the sludge separated by the solid-liquid separation device to the biological treatment device, a concentration device for concentrating at least a portion of a residual sludge, and a solubilizing tank for solubilizing, by thermophilic bacteria, the sludge concentrated in the concentration device. According to the tenth aspect of the present invention, it is possible to execute the treatment method according to the first aspect of the present invention wherein a high solubilization ratio can be ensured and the size of the solubilizing tank can be reduced.

An eleventh aspect of the present invention is directed to an apparatus for treating an organic waste water according to the tenth aspect of the present invention, further comprising a route for returning at least portion of the treated liquid solubilized by the solubilizing tank to the biological treatment device. Consequently, it is possible to execute the treatment method according to the second aspect of the present invention wherein the sludge can be reduced.

A twelfth aspect of the present invention is directed to an apparatus for biologically treating an organic waste water. The apparatus comprises a biological treatment device for biologically treating the organic waste water, a solid-liquid separation device for solid-liquid separating the waste water treated by the biological treatment device into treated water and a sludge, a concentration device for concentrating the sludge separated by the solid-liquid separation device, a route for returning a portion of the sludge concentrated by the concentration device to the biological treatment device, and a solubilizing tank for solubilizing at least a portion of a residual sludge by thermophilic bacteria. According to the twelfth aspect of the present invention, it is possible to execute the treatment method according to the third aspect of the present invention wherein the quality of the treated water can be improved, a high solubilization ratio can be ensured, and the size of the solubilizing tank can be reduced.

A thirteenth aspect of the present invention is directed to an apparatus for treating an organic waste water according to the twelfth aspect of the present invention, further comprising a route for returning at least a portion of the treated liquid solubilized by the solubilizing tank to the biological treatment device. Consequently, it is possible to execute the treatment method according to the fourth aspect of the present invention in which the sludge can be reduced.

A fourteenth aspect of the present invention is directed to an apparatus for biologically treating an organic waste water. The apparatus comprises a biological treatment device having a membrane separation device provided in a tank, a concentration device for concentrating at least a portion of the sludge separated by the biological treatment device, and a solubilizing tank for solubilizing the sludge concentrated in the concentration device using thermophilic bacteria. According to the fourteenth aspect of the present invention, it is possible to execute the treatment method according to the fifth aspect of the present invention wherein the quality of the treated water can be enhanced with the apparatus having a comparatively simple structure and the treatment can be performed efficiently at low cost.

A fifteenth aspect of the present invention is directed to the apparatus for treating an organic waste water according to the fourteenth aspect of the present invention, further comprising a route for returning at least a portion of the treated liquid solubilized by the solubilizing tank to the biological treatment device. Consequently, it is possible to execute the treatment method according to the sixth aspect of the present invention in which a decrease in the sludge can be achieved.

In the present invention, the solid-liquid separation device represents a precipitation device and a membrane separation device, for example. As the concentration device, centrifugal concentration, floating concentration, evaporating concentration, membrane concentration, and the like can be employed. A concentrator of a floating ring lamination type also can be used.

The biological treatment device used in the apparatus of the present invention can be used in both an aerobic biological treatment and an anaerobic biological treatment. It is preferred that the aeration tank used for the aerobic biological treatment is provided with aeration means. The aeration treatment is executed at a room temperature preferably with an airflow of 0.1 to 0.5 vvm in such a manner that aerobic digesting decomposition can be achieved. It also can be performed at a higher temperature with a larger airflow depending on a load. It is preferred that the pH value in the aeration tank is controlled to pH 5 to 8. In order to promote aerobic digesting decomposition, a microorganism, such as yeast, and a flocculant to promote floc formation, such as aluminum sulfate, polychlorinated aluminum, ferric chloride, or ferrous sulfate, can be added to the aeration tank.

The aerobic biological treatment can be performed by the devices capable of performing an aerobic treatment other than the aeration tank. For the anaerobic biological treatment, it is possible to use a method of circulating a solution in a tank to perform mixing, a method for circulating and bubbling a generated gas to perform mixing, a method using an agitator such as a stirring blade, and a method using active microorganism fixing means, i.e., means for efficiently causing an active microorganism to come in contact with waste water to be treated.

It is desirable that a membrane having a pore of 0.1 to 2.5 $\mu$m, preferably, 0.3 to 0.5 $\mu$m, is used in the membrane separation device provided on the aeration tank, for example. Furthermore, a membrane separation device having one or more membrane module structures is suitable. Examples of a preferred membrane separation device includes an immersion type membrane separation device having a T-type filter element, manufactured by Yuasa Corporation. It is preferred that the membrane separation device has a structure in which washing means utilizing pressurization by hydraulic pressure, air pressure, or the like, rubbing, vibration, chemical injection, or the like is built in the membrane separation device, or is provided thereon, and substances that do not pass through the membrane foul a membrane surface as little as possible.

While a sludge is decomposed by thermophilic bacteria (for example, a biomass, such as bacillus, stearothermophilous, or the like, can be added) at the solubilizing step, decomposition can be performed in combination with various methods which are conventionally known, for example, ozone decomposition, electrolysis, thermal alkaline decomposition, and enzyme decomposition (for example, protease, lipase, glycositase, and the like, are added solely or in combination).

In the present invention, the following represents "the solubilization is carried out using heat and under the conditions such that the sludge solubilization enzyme is produced and secreted from a microorganism, and the solubilization is promoted by the enzyme":

(1) Temperature: 50° C. to 80° C., preferably 60° C. to 70° C.;

(2) Concentration of the sludge: 1000 mg/l or more, preferably 5000 mg/l or more, more preferably 10,000 mg/l or more (i.e., a water content of 99% or less);

(3) pH: 7 to 9, preferably 7.5 to 8.5;

(4) Environment: aerobic or microaerobic conditions; and (5) Time: determined based on an HRT of the sludge to be treated in the solubilizing tank.

In cases where the excess sludge is solubilized continuously, the HRT is determined from the amount of an inflow and an effective volume of a reactor. In other words, the HRT (hydraulic residence time) can be calculated based on an equation of HRT=V/Q (V is the capacity of the reactor, Q is the amount of the inflow).

HRT is directly proportional to the volume of the reactor. The excess sludge is solubilized in a solubilizing treatment device, i.e., a reactor. Therefore, to achieve solubilization to a desired extent, it is apparent that the volume of the reactor can be reduced as the HRT is shortened. In consideration of an aspect of the present invention, i.e., reduction of the equipment size, the solubilization time is determined based on the HRT so that a lengthy solubilizing treatment can be avoided.

It is preferred that the production and secretion quantities of the sludge solubilization enzyme are monitored to select an HRT at which the production and secretion quantities are maximized. If the HRT is thus set, the reaction performed by the produced and secreted sludge solubilization enzyme can be utilized efficiently. Usually, it is preferred that the HRT is set to 3 to 24 hours.

EXAMPLES

Examples of the present invention are described below.

1. Effect of Sludge Concentration (1) Example 1

FIG. 1 is a structural diagram schematically showing an apparatus for treating an organic waste water which is suitable for executing a method of the present invention for treating an organic waste water.

As shown in FIG. 1, original waste water A stored in organic waste water reservoir I is introduced into a biological treatment tank 3 through a route 2. The original waste water A, which is organic waste water, is subjected to an aerobic biological treatment in biological treatment tank 3. The aerobic biological treatment represents that an organic matter is decomposed into an inorganic matter, such as carbon dioxide or water, by biological oxidation. An aerobic microorganism used is gram-negative or gram-positive bacillus, for example, the Pseudomonas species and the Bacillus species, which have been used in an activated sludge method for sewage treatment. These inoculation bacteria are obtained from a usual sewage treatment plant. In this case, an operation is performed in such a manner that the temperature of biological treatment tank 3 is set to a range of 10° C. to 50° C., usually 20° C. to 30° C. In order to perform the treatment more efficiently, a high temperature is preferred. For example, in the case where mesophile bacteria separated from the excess sludge of sewage is used, the operation is performed at a temperature of 35° C. to 45° C. In any case, the operation should be performed by selecting an optimum temperature condition from the temperature range disclosed above such that a microorganism can perform the oxidative decomposition efficiently and fully. In this case, the biological treatment tank can be a batch type or a continuous type.

Subsequently, treated water B treated in biological treatment tank 3 is introduced through a route 4 into a precipitation tank 5 acting as a solid-liquid separation device and solid-liquid separated therein. Supernatant solution C obtained by the solid-liquid separation is subjected to a tertiary treatment, if necessary, such as denitrification or an ozone treatment according to the regulations of a discharge destination. The solution thus treated is reused or utilized.

On the other hand, a portion of sludge D separated in precipitation tank 5 is introduced into biological treatment tank 3 through a route 6. The quantity of sludge sent through route 6 is determined by the quantity of retention of the microorganism in biological treatment tank 3.

Furthermore, residual sludge E separated in precipitation tank 5 is introduced into a concentration tank 8 through route 7. Depending on circumstances, a portion of residual sludge E separated in precipitation tank 5 can be extracted to the outside of a system. Concentration tank 8 concentrates the sludge by gravity sedimentation. As a concentration method, a method utilizing floating concentration, evaporating concentration, membrane concentration, addition of a flocculant or centrifugal force also can be used. As described above, it is preferred that the sludge is concentrated to have a water content of 99% or less (i.e., sludge concentration of 1% or more). The solution obtained after concentration is introduced into a solubilizing tank 10 through a route 9. Solubilizing tank 10 solubilizes an organic sludge anaerobically or aerobically at a high temperature. In this case, inoculation bacteria (i.e., thermophilic bacteria) of an anaerobic or aerobic microorganism, which are to be used at a high temperature, are obtained by incubating the microorganism in an anaerobic or aerobic digesting tank according to the prior art, for example. While the operation is performed such that the optimum temperature of solubilizing tank 10 is preferably 50°C. to 90° C., the optimum temperature is varied depending on the type of the thermophilic bacteria for decomposing an organic solid contained in the sludge E to be treated at a high temperature. For example, in case of the thermophilic bacteria separated from an excess sludge of sewage treatment plant, the operation is performed at a high temperature of 55° C. to 75° C., preferably, about 65° C., in such a manner that the solubilizing reaction performed by the microorganism (thermophilic bacteria) and physicochemically thermal decomposition performed by heat can be carried out efficiently and fully at the same time. In any case, it is preferred that the temperature is set to a range of 50° C. to 90° C. depending on the type of microorganisms, in such a manner that the solubilizing reaction to be performed by the microorganism (thermophilic bacteria) and the physicochemically thermal decomposition to be performed by heat can be carried out efficiently and fully at the same time.

Furthermore, a device for aerobic microorganism decomposition in solubilizing tank 10 can be provided with a diffuser according to the prior art, and a device for anaerobic microorganism decomposition can use a method of circulating a solution in a tank for mixing, a method of circulating and bubbling a generated gas for mixing, a method having an agitator, such as a stirring blade, and a method having active microorganism fixing means, i.e., means for efficiently causing an active microorganism to come in contact with a sludge to be treated. In this case, the solubilizing tank can be a batch type or a continuous type.

Thus, treated solution F solubilized in solubilizing tank 10 is introduced into biological treatment tank 3 through a route 11 such that an aerobic biological treatment is performed there. Subsequently, the above-mentioned treatment cycle is repeated.

(2) Example 2

Figure 2:
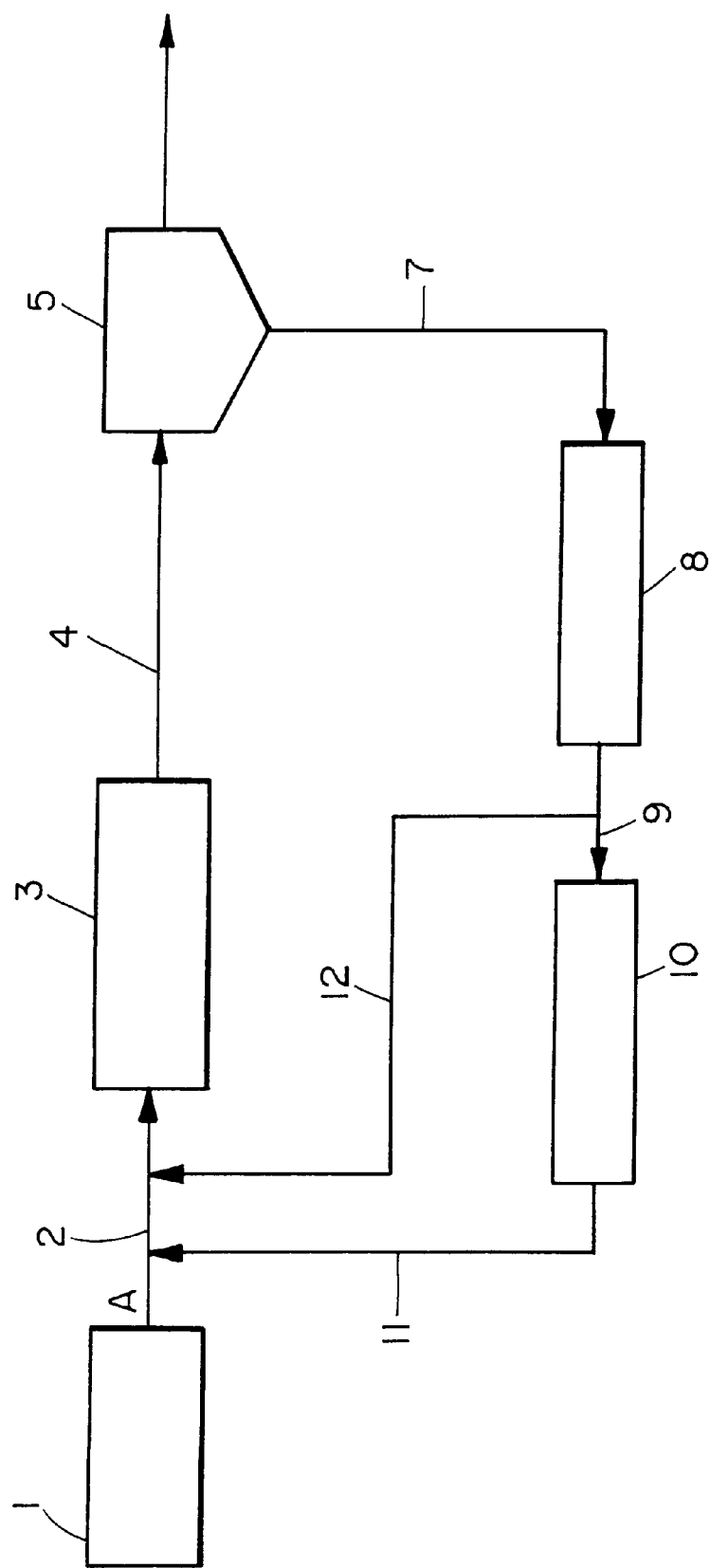
FIG. 2 is a structural diagram schematically showing an apparatus for treating an organic waste water suitable for executing a method of treating an organic waste water according to another embodiment of the present invention.

FIG. 2 is a structural diagram schematically showing an apparatus for treating an organic waste water, which is suitable for executing a method of treating an organic waste water according to another embodiment of the present invention. The apparatus shown in FIG. 2 is different from the apparatus shown in FIG. 1 in that route 6 is not provided, all sludge separated in precipitation tank 5 is introduced into concentration tank 8, a part of the sludge concentrated to have a water content of 99% or less (a sludge concentration of 1% or more) in concentration tank 8 is introduced into biological treatment tank 3 through route 12, a residual sludge is introduced into solubilizing tank 10 and solubilized by thermophilic bacteria, the solubilized solution is introduced into biological treatment tank 3 through route 11, and an aerobic biological treatment of the concentrated sludge and the solubilized solution is performed in biological treatment tank 3. Subsequently, the above-mentioned treatment cycle is repeated. A part of the sludge concentrated in concentration tank 8 can be extracted to the outside of a system.

In order to confirm the advantages of the present invention, an angular tank was used as a biological treatment tank. The tank was made of transparent polyvinyl chloride resin and had an effective volume of 40 liters, with a sectional area of 800 $cm^2$ and a height of 60 cm, and the biological treatment tank was aerated with an airflow of 0.3 vvm, a lower pyramid type angular tank was used as a recipitation tank, which was made of transparent polyvinyl chloride resin and had an effective volume of 10 liters with a sectional area of 400 $cm^2$ and a height of 40 cm. A lower cone type cylindrical tank was used as a concentration tank, which was made of transparent polyvinyl chloride resin and had an effective volume of 2 liters with an inside diameter of 10 cm and a height of 40 cm. A glass cylinder was used as a solubilizing tank, which had an effective volume of 2 liters with an inside diameter of 13 cm and a height of 25 cm, and the solubilizing tank was aerated with an airflow of 0.5 vvm. 1 vvm means "1 liter air volume/l liter reactor volume/–min." Organic waste water (original waste water) having properties of peptone:glucose:yeast extract 4:4:1 was used, and the apparatus shown in FIG. 1 was operated by regulating the quantity of the sludge flowing into route 6 with a load of 0.4 kg BOD/m³/day in such a manner that biological treatment tank 3 had a sludge concentration of about 3000 mg/liter. The apparatus shown in FIG. 2 was operated by regulating the quantity of a sludge in such a manner that the quantity of the sludge flowing into route 12 was equal to the quantity of the sludge flowing into route 6 shown in FIG. 1. While the precipitation tank has been used for solid-liquid separation in the above-mentioned example, it is apparent that a device typically used for solid-liquid separations, such as a membrane separation device, can be used, for example.

(3) Comparative Example

Figure 3:
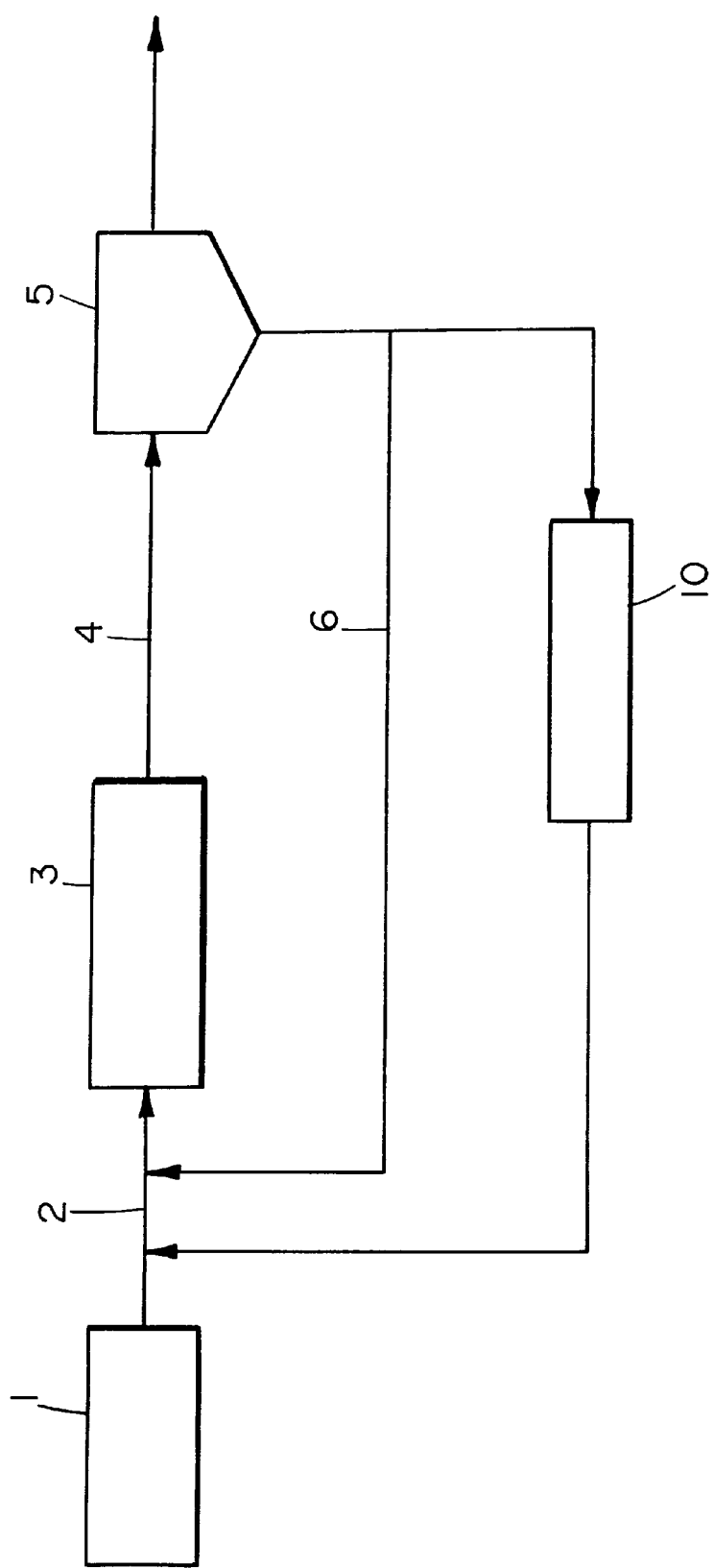
FIG. 3 is a structural diagram schematically showing an apparatus for treating an organic waste water according to the prior art.

For comparison, as shown in FIG. 3, an apparatus for treating an organic waste water, in which concentration tank 8 was removed from the apparatus shown in FIG. 1, was operated using the above-mentioned organic waste water with the above-mentioned airflow and the above-mentioned BOD load, and regulating the quantity of a sludge flowing into route 6 in such a manner that biological treatment tank 3 had a sludge concentration of about 3000 mg/liter. Consequently, the results listed in the following Table 1 were obtained.

TABLE 1

|  | Comparative Example | Example 1 | Example 2 |
|---|---|---|---|
| Sludge concentration of biological treatment tank (mg/liter) | 3000 | 3080 | 4800 |
| Sludge concentration of precipitation tank (mg/liter) | 5900 | 5790 | 5530 |
| Sludge concentration of concentration tank (mg/liter) | — | 9750 | 10800 |
| Sludge to be treated at solubilizing tank (liter/day) | 2.0 | 1.4 | 1.2 |
| Quality of treated water |  |  |  |
| BOD (mg/liter) | <5 | <5 | <5 |
| S-TOC (mg/liter) | 23 | 22 | 17 |
| SS (mg/liter) | 22 | 21 | 20 |

From Table 1, the following results are illustrated.

(1) According to Example 1, the sludge concentrated in the concentration tank is introduced into the solubilizing tank. Therefore, the quantity of the sludge to be treated in the solubilizing tank can be decreased more than in the comparative example. Consequently, the size of the solubilizing tank can be reduced.

(2) According to Example 2, all the sludge separated in the precipitation tank is introduced into the concentration tank. Therefore, in addition to the advantage that the size of the solubilizing tank can be reduced in the same manner as in Example 1, the quality of treated water can be improved because the concentration of the sludge in the biological treatment tank is increased, i.e., the quantity of microorganisms in the biological treatment tank is increased.

(3) According to the comparative example, a large quantity of sludge is treated in the solubilizing tank. In addition, the quality of treated water is the lowest.

2. Specification of Treatment Time for Solubilizing Reaction

Example 3: Change in Enzyme Production by Microorganism Corresponding to a Residence Time A yeast-peptone medium, manufactured by DIFCO Co., Ltd., (4 g of yeast extract, 8 g of peptone and 1 liter of water, pH 6.8) was put into a reactor made of glass, and bacillus stearothermophilus SPT 2-1 [FERM P-15395], which was derived from an excess sludge of a sewage treatment plant and preincubated, was raised and concussively incubated at a temperature of 65° C. First, an HRT was set to 36 hours while an incubation solution is continuously supplied. In order to shorten the HRT to a predetermined time, while the quantity of organic matter to be introduced is kept constant, an appropriate quantity of dilution water was added for incubation. A supernatant solution was sampled at each residence time, and each protease activity was measured as follows. More specifically, an equivalent sample was added to 0.7 ml of a solution (5 mg/ml) obtained by suspending azocoal (trade name, manufactured by Sigma Co., Ltd.) acting as a substrate for nonspecific protease assay into a phosphoric acid buffer solution having pH 7.0. The mixture was incubated for 30 minutes at a temperature of 70° C. After the reaction was completed, an absorbance at 520 nm was measured. When a similar measurement was conducted using, as a sample, 30 μg/ml of the phosphoric acid buffer solution (pH 7.0) of trypsin (about 400 BAEE U/mg, manufactured by Wako Junyaku Co., Ltd.), an absorbance of 1.0 was obtained at 520 nm.

Figure 4:
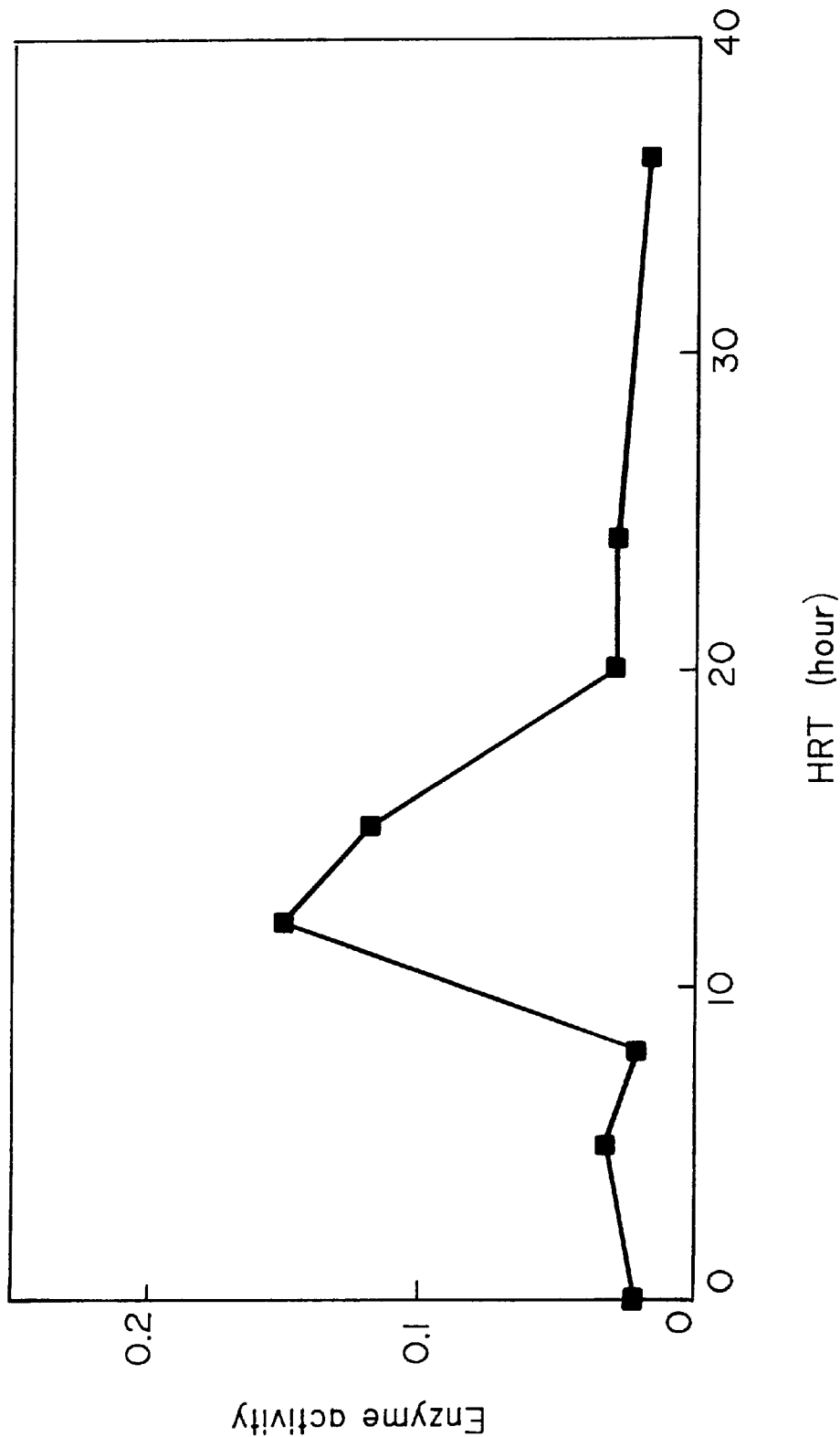
FIG. 4 is a chart showing a change in protease production by bacteria for an HRT at a solubilizing step according to the method of the present invention.

The obtained results are shown in FIG. 4. It has been found that the enzyme activity reaches a peak at an HRT of 12 hours and then is lowered to a low level before an HRT of 20 hours. Accordingly, it is apparent that the HRT suitable for the enzyme production by the strain is about 12 hours.

Example 4: Change in Enzyme Production by Excess Sludge Corresponding to a Residence Time After bacillus stearothermophilus SPT 2-1 [FERM P-15395], which was derived from an excess sludge of a sewage treatment plant and preincubated, was raised, an excess sludge derived from the sewage treatment plant (which had an organic solid (vss) concentration of 3% by weight) was put into a 5-liter jar fermenter made of glass, and was treated at a temperature of 65° C. with an airflow of 0.3 vvm and a stirring speed of 300 rpm. In the same manner as in Example 3, an HRT first was set to 36 hours, dilution water was suitably injected to set a predetermined HRT, and a protease activity at each HRT was measured. The excess sludge of the sewage treatment plant was obtained by precipitating and separating a sludge in a final precipitation tank, and further causing the precipitated sludge to be subjected to floating concentration.

Figure 5:
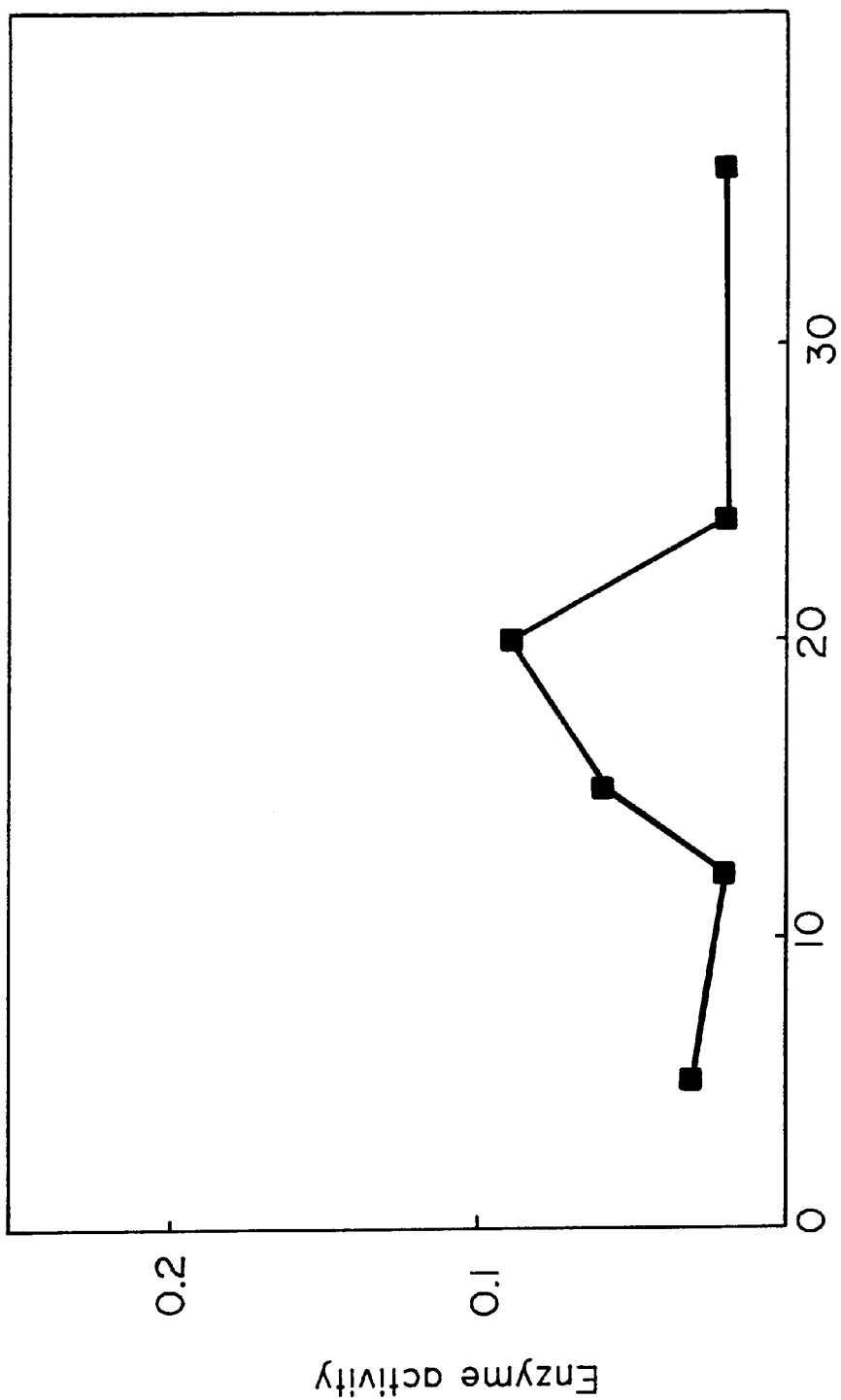
FIG. 5 is a chart showing a change in protease production by an excess sludge for the HRT at the solubilizing step according to the method of the present invention.

The obtained results are shown in FIG. 5. It has been found that the enzyme activity reaches a peak at an HRT of 15 to 20 hours, and then are reduced to a lower level before an HRT of 25 hours. Accordingly, it is apparent that the HRT suitable for the enzyme production is about 20 hours.

Example 5: Change in Solubilization Ratio of Excess Sludge Corresponding to a Residence Time An excess sludge was treated in the same manner as in Example 4, a solubilization sample was taken at each HRT to measure an organic solid (vss) content, and a solubilization ratio (%) at each time was measured based on the vss content obtained before the treatment. The vss content was measured in accordance with JISK0102.

Figure 6:
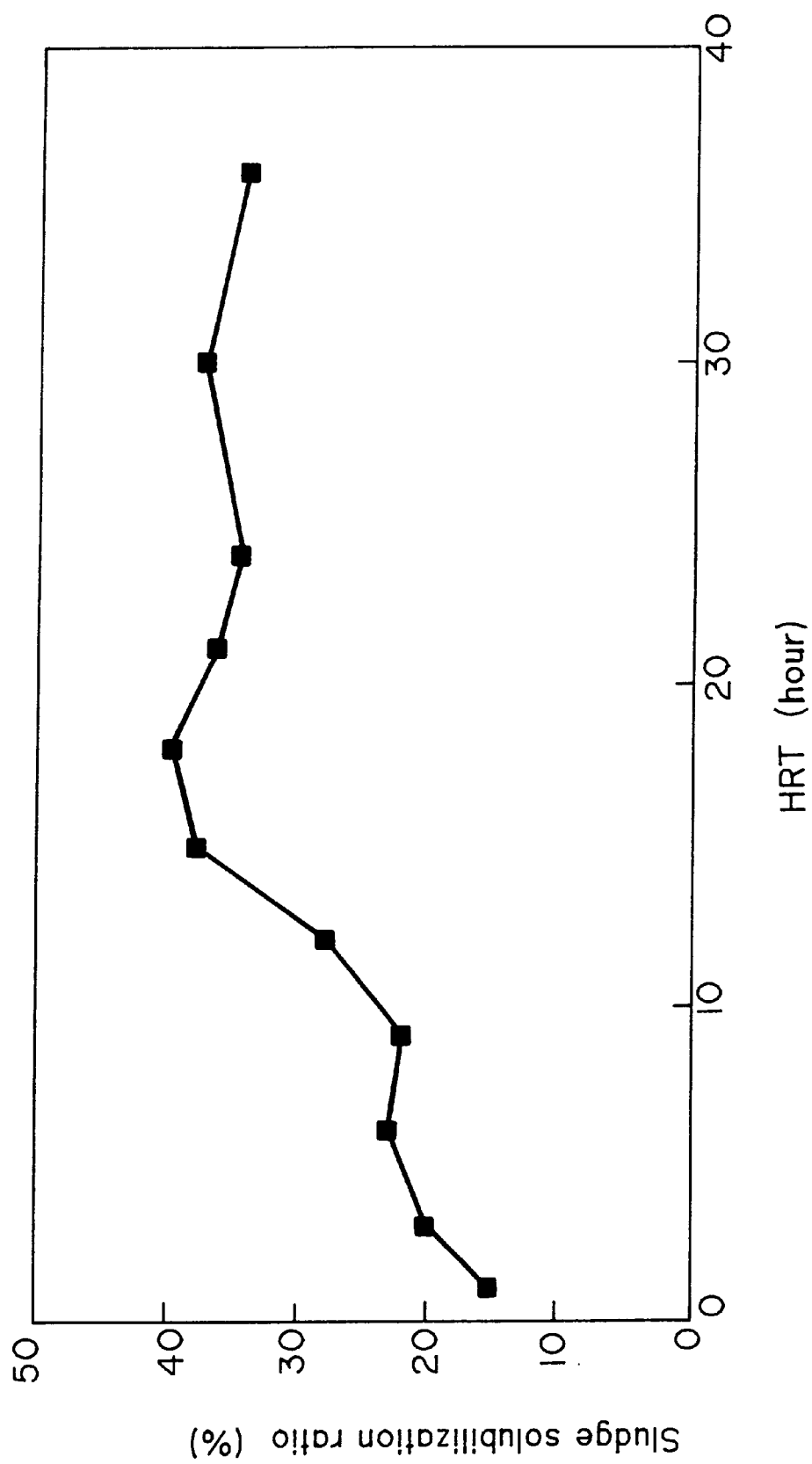
FIG. 6 is a chart showing a change in a solubilization ratio of the excess sludge for the HRT at the solubilizing step according to the method of the present invention.

The obtained results are shown in FIG. 6. It is apparent from FIG. 6 that the solubilization ratio is maximum at an HRT of about 15 to 20 hours, and an increase in the solubilization ratio, which is attributed to heating, can be detected at an HRT of 3 to 9 hours.

From the results of Examples 4 and 5, accordingly, the following was suggested. More specifically, in the case of solubilizing 3% by weight of the excess sludge derived from the sewage treatment plant under the conditions suitable for the enzyme production, it is preferable that the protease activity would be monitored to select an HRT at which the protease activity reaches a peak. In this case, it has been found that the solubilization can be performed efficiently at an HRT of 3 to 24 hours because the actions of the heat and the enzymes are maximized.

3. Treatment of Waste Water Performed by a Biological Treatment Tank Provided with Membrane Separation Device Example 6

Figure 7:
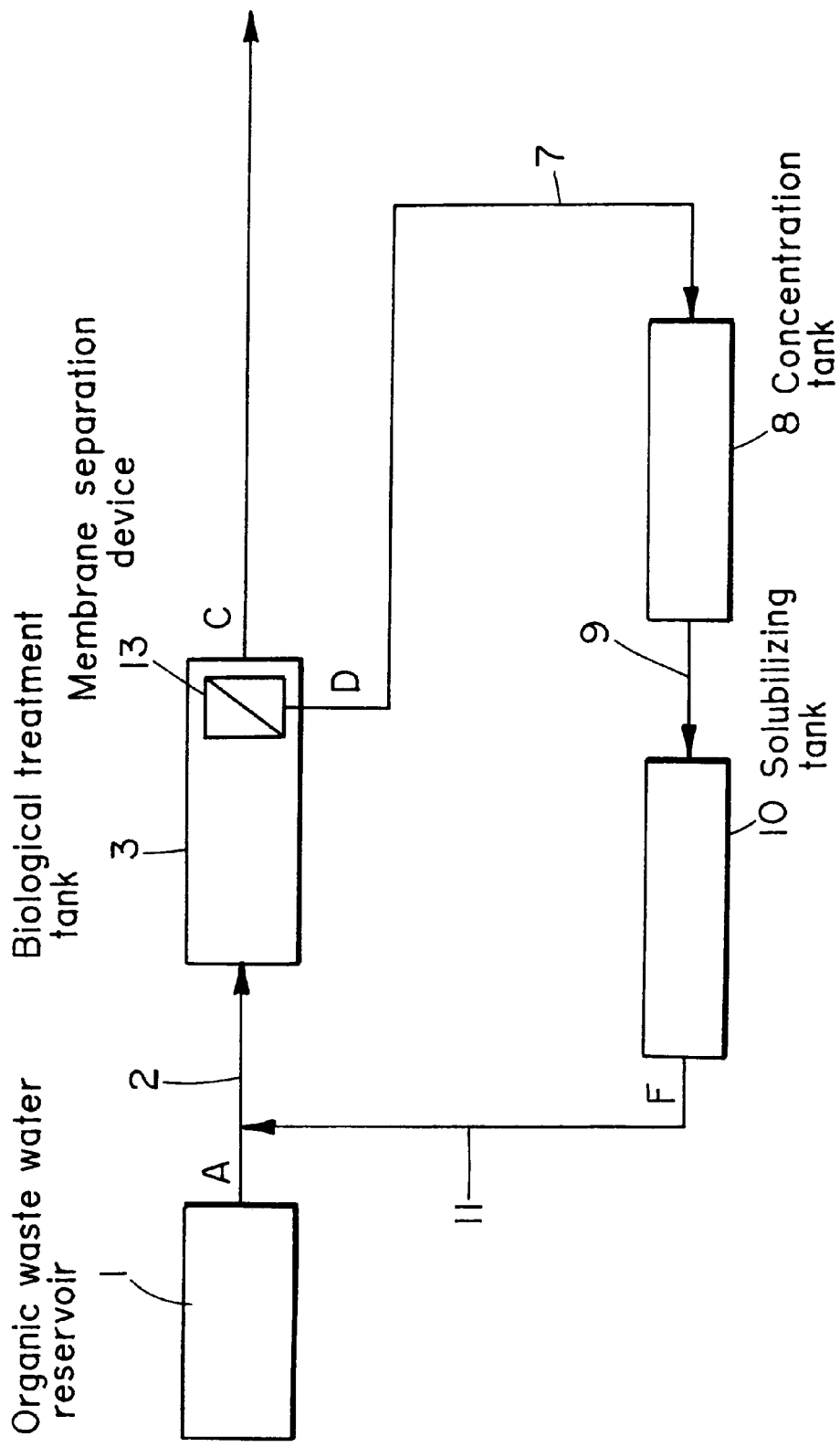
FIG. 7 is a structural diagram schematically showing an apparatus for treating an organic waste water suitable for executing a method of treating an organic waste water according to yet another embodiment of the present invention.
Figure 8:
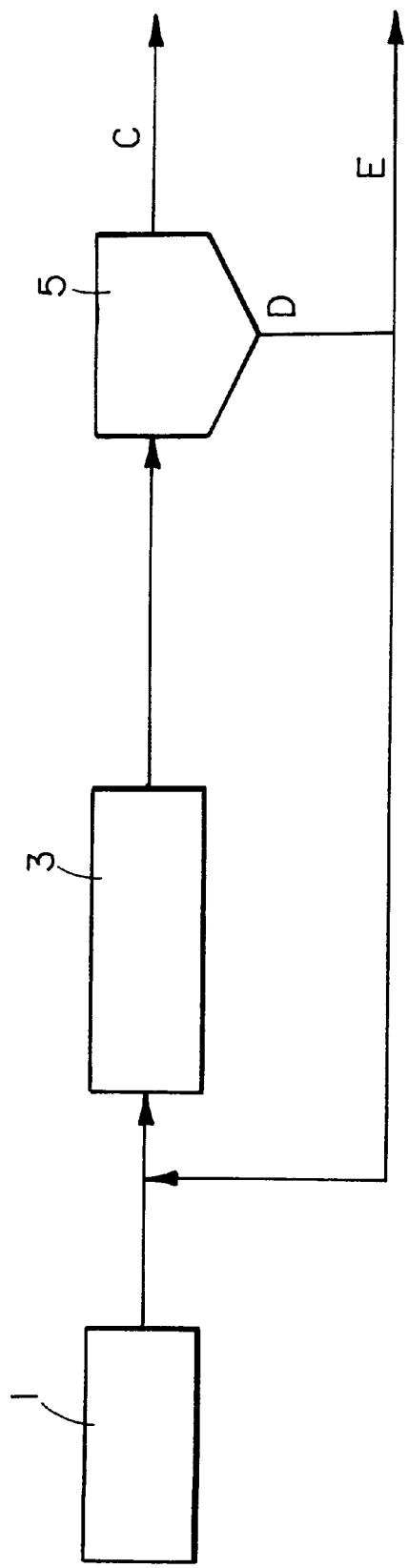
FIG. 8 is a structural diagram schematically showing another apparatus for treating an organic waste water according to the prior art.
Figure 9:
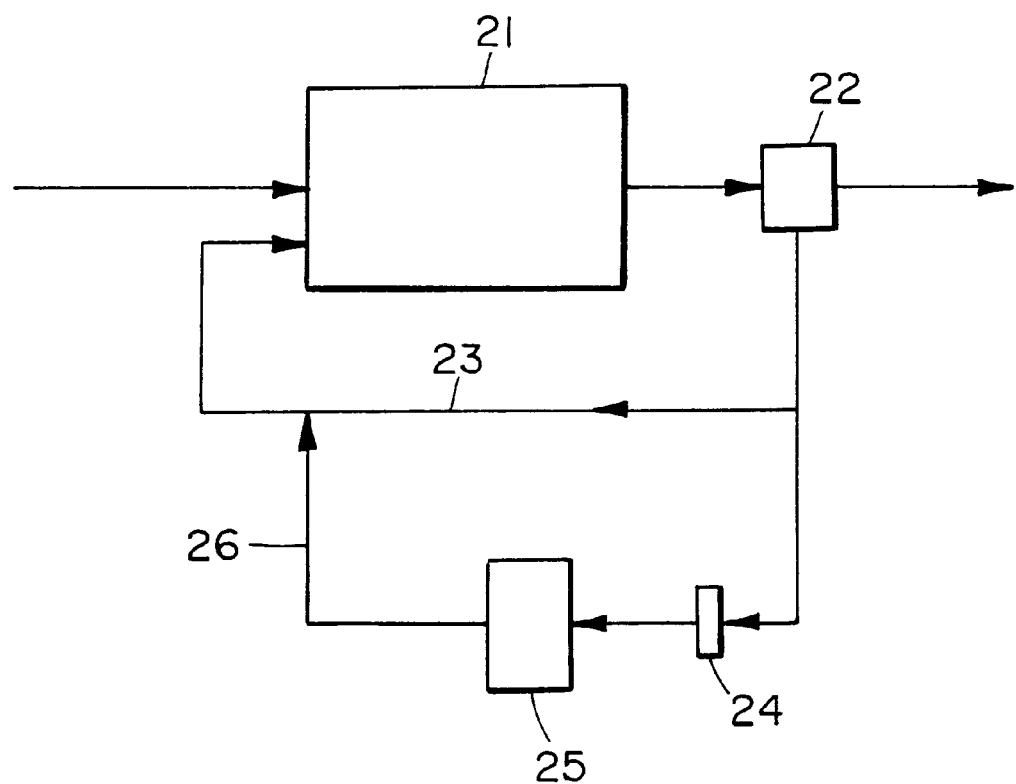
FIG. 9 is a structural diagram schematically showing a further apparatus for treating an organic waste water according to the prior art.

In Example 6, route 6 was removed from the structure of FIG. 1, the same tanks as concentration tank 8 and the solubilizing tank 10 in FIG. 1 were used, and biological treatment tank 3 provided with immersion-type membrane separation device 13 (manufactured by Yuasa Corporation, a T-type filter element) was used in place of biological treatment tank 3 and precipitation tank 5. FIG. 7 schematically shows the structure of an apparatus for treating an organic waste water according to Example 6. The operation of the apparatus was performed using the above-mentioned organic waste water with the above-mentioned airflow and the above-mentioned BOD load, and regulating the quantity of a sludge flowing into route 7 in such a manner that biological treatment tank 3 had a sludge concentration of about 12000 mg/liter.

Comparative Example

For comparison, the apparatus for treating organic waste water shown in FIG. 3 was operated using the above-mentioned organic waste water with the above-mentioned airflow and the above-mentioned BOD load by regulating the quantity of a sludge-flowing into route 6 in such a manner that biological treatment tank 3 had a sludge concentration of about 3000 mg/liter. Consequently, the results listed in the following Table 2 were obtained.

TABLE 2

|  | Comparative Example | Example 6 |
| --- | --- | --- |
| Sludge concentration of biological treatment tank (mg/liter) | 3050 | 12040 |
| Sludge concentration of precipitation tank (mg/liter) | 5800 | — |
| Sludge concentration of concentration tank (mg/liter) | — | 25000 |
| Sludge to be treated at solubilizing tank (liter/day) | 2.0 | 0.5 |
| Quality of treated water |  |  |
| BOD (mg/liter) | <5 | <5 |
| S-TOC (mg/liter) | 20 | 18 |
| SS (mg/liter) | 18 | 1 |

(1) According to Example 6, all the sludge separated in the biological treatment tank is introduced into the concentration tank. Therefore, in addition to the advantage that the size of the solubilizing tank can be reduced, the quality of the treated water can be improved because the concentration of the sludge in the biological treatment tank is increased, that is, the quantity of microorganisms in the biological treatment tank is increased.

(2) According to the comparative example, a large quantity of sludge is treated in the solubilizing tank. In addition, the quality of treated water is low.

In view of the foregoing, the following advantages can be obtained from the present invention.

(1) According to the first aspect of the present invention, the concentrated sludge is directed to the solubilizing tank. Therefore, the solubilizing tank has nutritive conditions suitable for growth of thermophilic bacteria, and the solubilization enzyme also is produced. Therefore, a high solubilization ratio can be obtained. Since the quantity of the sludge to be treated in the solubilizing tank can be reduced, the size of the solubilizing tank can be reduced.

(2) According to the third aspect of the present invention, the following advantage can be obtained in addition to the advantages that a high solubilization ratio can be ensured and the size of the solubilizing tank can be reduced. More specifically, all the sludge separated by the solid-liquid separation device is concentrated and a portion of the concentrated sludge is directed to the biological treatment device. Therefore, the quantity of microorganisms to be directed to the biological treatment device can be kept at a high concentration such that the quality of treated water can be improved.

(3) According to the fifth aspect of the present invention, in addition to the advantage that a high-solubilization ratio can be ensured and the size of the solubilizing tank can be reduced, waste water can efficiently be treated because the digesting decomposition of the organic waste water and the solid-liquid separation based on membrane separation are simultaneously performed. Furthermore, there is no hindrance to solid-liquid separation caused by the deterioration of sedimentation properties of the sludge in the gravity precipitation tank. Therefore, the quantity of biological retention in the biological treatment device can be kept at a high concentration. Consequently, the quality of treated water can be enhanced.

(4) According to the second, fourth, and sixth aspects of the present invention, the sludge can be reduced.

(5) According to the seventh aspect of the present invention, the solubilizing tank has nutritive conditions more suitable for the growth of thermophilic bacteria. Consequently, the solubilizing treatment can be performed more efficiently and the size of the solubilizing tank can be reduced still more.

(6) According to the eighth aspect of the present invention, a lengthy solubilizing reaction can be avoided. Therefore, the size of the solubilizing tank can be reduced and the solubilizing reaction can be performed efficiently.

(7) According to the ninth aspect of the present invention, the sludge can be solubilized efficiently.

(8) According to the tenth aspect of the present invention, it is possible to provide a treatment apparatus suitable for executing the treatment method according to the first aspect of the present invention.

(9) According to the eleventh aspect of the present invention, it is possible to provide a treatment apparatus suitable for executing the treatment method according to the second aspect of the present invention.

(10) According to the twelfth aspect of the present invention, it is possible to provide a treatment apparatus suitable for executing the treatment method according to the third aspect of the present invention.

(11) According to the thirteenth aspect of the present invention, it is possible to provide a treatment apparatus suitable for executing the treatment method according to the fourth aspect of the present invention.

(12) According to the fourteenth aspect of the present invention, it is possible to provide a treatment apparatus suitable for executing the treatment method according to the fifth aspect of the present invention.

(13) According to the fifteenth aspect of the present invention, it is possible to provide a treatment apparatus suitable for executing the treatment method according to the sixth aspect of the present invention.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A method of biologically treating an organic waste water, comprising the steps of:

biologically treating the organic waste water im a biological treatment device;

solid-liquid separating the waste water treated in the biological treatment device into a treated water and a sludge by a solid-liquid separation device;

returning a portion of the sludge separated by the solid-liquid separation device to the biological treatment device;

concentrating at least a portion of a residual sludge by a concentration device; and solubilizing the concentrated sludge by an aerobic thermophilic bacteria in a solubilizing tank, wherein the solubilizing treatment is performed using heat and under the conditions such that a sludge solubilization enzyme is produced and secreted from a microorganism and the solubilization is promoted by the enzyme and a time requirement for the solubilizing treatment is determined based on a hydraulic residence time of the treated liquid in the solubilizing treatment device.

2. The method of claim 1 wherein the hydraulic residence time is 3 to 24 hours.

* * * * *

UNITED STATES PATENT AND TRADEMARK OFFICE
CERTIFICATE OF CORRECTION

PATENT NO. : 6,224,769 B1
DATED : May 1, 2001
INVENTOR(S) : Hasegawa et al.

It is certified that error appears in the above-identified patent and that said Letters Patent is hereby corrected as shown below:

<u>Column 15,</u>
Line 17, "im" should be -- in --

Signed and Sealed this

Nineteenth Day of March, 2002

Attest:

*Attesting Officer*

JAMES E. ROGAN
*Director of the United States Patent and Trademark Office*